United States Patent [19]
Hirota

[11] Patent Number: 5,996,338
[45] Date of Patent: Dec. 7, 1999

[54] EXHAUST GAS PURIFYING DEVICE FOR ENGINE

[75] Inventor: Shinya Hirota, Susono, Japan

[73] Assignee: Toyota Jidosha Kabushiki Kaisha, Aichi, Japan

[21] Appl. No.: 08/959,037

[22] Filed: Oct. 28, 1997

[30] Foreign Application Priority Data

Nov. 1, 1996 [JP] Japan .................................... 8-291763

[51] Int. Cl.⁶ .............................. F01N 3/20; B01D 53/36
[52] U.S. Cl. .................................. 60/285; 60/300; 60/301
[58] Field of Search ............................ 60/286, 297, 300, 60/301, 303, 285

[56] References Cited

U.S. PATENT DOCUMENTS

| | | | |
|---|---|---|---|
| 5,191,763 | 3/1993 | Yuuki ..................................... | 60/286 X |
| 5,195,318 | 3/1993 | Shinzawa et al. .................... | 60/286 X |
| 5,216,880 | 6/1993 | Aoki et al. ............................ | 60/286 X |
| 5,271,906 | 12/1993 | Yuuki et al. .......................... | 60/300 X |
| 5,357,749 | 10/1994 | Ohsuga et al. ....................... | 60/300 X |
| 5,634,331 | 6/1997 | Aoki et al. ............................ | 60/300 X |
| 5,711,149 | 1/1998 | Araki ..................................... | 60/286 X |
| 5,785,138 | 7/1998 | Yoshida ................................. | 60/300 X |
| 5,802,845 | 9/1998 | Abe et al. ................................. | 60/274 |

FOREIGN PATENT DOCUMENTS

4-175416  6/1992  Japan .

*Primary Examiner*—John E. Ryznic
*Attorney, Agent, or Firm*—Kenyon & Kenyon

[57] ABSTRACT

An exhaust gas purifying device for an engine comprises an exhaust gas purifying catalyst with an electric heater arranged in the exhaust passage capable of temporarily adsorbing $NO_X$ in the inflowing exhaust gas therein. A $NO_X$ adsorbing capacity of the exhaust gas purifying catalyst becomes larger when a temperature of the exhaust gas purifying catalyst becomes higher. The heater is turned on and is turned off alternately and repeatedly to thereby increase and reduce the catalyst temperature. $NO_X$ in the inflowing exhaust gas is adsorbed in the exhaust gas purifying catalyst when the catalyst temperature falls, and the adsorbed $NO_X$ is desorbed from the exhaust gas purifying catalyst and reduced when the catalyst temperature increases. The catalyst temperature is controlled to increase to a first upper threshold temperature, at which the $NO_X$ adsorbing capacity of the exhaust gas purifying catalyst is substantially zero, and is controlled to fall to a first lower threshold temperature, at which the $NO_X$ adsorbing capacity of the exhaust gas purifying catalyst is substantially a maximum.

27 Claims, 8 Drawing Sheets

EXHAUST GAS PURIFYING DEVICE FOR ENGINE

BACKGROUND OF THE PRESENT INVENTION

1. Field of the Invention

The present invention relates to an exhaust gas purifying device for an engine.

2. Description of the Related Art

Japanese Unexamined Patent Publication No. 4-175416 discloses an exhaust gas purifying device for an engine provided with a catalyst arranged in an exhaust passage of the engine, composed of zeolite carrying a transition metal or a precious metal thereon, which is so-called a zeolite catalyst, and a catalyst temperature control device for controlling a temperature of the zeolite catalyst to increase and lower the catalyst temperature alternately and repeatedly in a so-called temperature window of the zeolite catalyst.

On the other hand, the inventors of the present invention have found that the zeolite catalyst has a $NO_X$ adsorbing function in which the catalyst temporarily adsorbs the nitrogen oxides $NO_X$ in the inflowing exhaust gas therein, and that the $NO_X$ adsorbing capacity of the zeolite catalyst becomes lower when the catalyst temperature becomes lower. Thus, lowering the catalyst temperature increases the $NO_X$ adsorbing capacity of the zeolite catalyst, and therefore, the zeolite catalyst temporarily adsorbs $NO_X$ in the inflowing exhaust gas. Contrarily, increasing the catalyst temperature decreases the $NO_X$ adsorbing capacity of the zeolite catalyst, and therefore, the zeolite catalyst desorbs the adsorbed $NO_X$. Namely, increasing and lowering the catalyst temperature alternately and repeatedly causes the zeolite catalyst to perform the $NO_X$ adsorption and the $NO_X$ desorption and purification, alternately and repeatedly.

Further, the inventors of the present invention have also found that, if the inflowing exhaust gas includes a reducing agent, such as hydrocarbon (HC), almost all of $NO_X$ desorbed from the zeolite catalyst is reduced and purified in an oxidizing atmosphere by the reducing agent. Thus, it is preferable for purifying $NO_X$ sufficiently in the exhaust gas by the zeolite catalyst, to make the $NO_X$ amount adsorbed in the zeolite catalyst as large as possible when the catalyst temperature drops. It is also preferable, for making the adsorbed $NO_X$ amount as large as possible when the catalyst temperature drops, to make the $NO_X$ amount desorbed from the zeolite catalyst as large as possible when the catalyst temperature rises.

As described before, the inventors of the present invention have found that the $NO_X$ adsorbing capacity of the zeolite catalyst becomes larger when the catalyst temperature becomes lower. In other words, the $NO_X$ amount to be adsorbed in the zeolite catalyst becomes larger as the catalyst temperature becomes lower, when the catalyst temperature drops. The $NO_X$ amount to be desorbed from the zeolite catalyst becomes larger as the catalyst temperature becomes higher, when the catalyst temperature rises. Namely, it is most effective for a sufficient $NO_X$ purification to lower the catalyst temperature to a temperature at which the $NO_X$ adsorbing capacity almost becomes a maximum, and increase the catalyst temperature to a temperature at which the $NO_X$ adsorbing capacity almost becomes zero.

SUMMARY OF THE INVENTION

An object of the present invention is to provide an exhaust gas purifying device for an engine capable of making an amount of $NO_X$ adsorbed in the exhaust gas purifying catalyst larger, to thereby purify $NO_X$ sufficiently.

According to one aspect of the present invention, there is provided an exhaust gas purifying device for an engine having an exhaust passage comprising: an exhaust gas purifying catalyst arranged in the exhaust passage capable of temporarily adsorbing $NO_X$ in the inflowing exhaust gas therein, a $NO_X$ adsorbing capacity thereof becoming larger when the temperature of the exhaust gas purifying catalyst becomes lower; and catalyst temperature control means for controlling the temperature of the exhaust gas purifying catalyst, the catalyst temperature control means controlling the catalyst temperature to increase and fall alternately and repeatedly, to thereby adsorb $NO_X$ in the inflowing exhaust gas in the exhaust gas purifying catalyst when the catalyst temperature falls, and to desorb $NO_X$ adsorbed in the exhaust gas purifying catalyst and reduce the $NO_X$ when the catalyst temperature increases, wherein the catalyst temperature is controlled to increase to a first upper threshold temperature, at which the $NO_X$ adsorbing capacity of the exhaust gas purifying catalyst is substantially zero.

According to another aspect of the present invention, there is provided an exhaust gas purifying device for an engine having an exhaust passage comprising: an exhaust gas purifying catalyst arranged in the exhaust passage capable of temporarily adsorbing $NO_X$ in the inflowing exhaust gas therein, a $NO_X$ adsorbing capacity thereof becoming larger when a temperature of the exhaust gas purifying catalyst becomes higher; and catalyst temperature control means for controlling the temperature of the exhaust gas purifying catalyst, the catalyst temperature control means controlling the catalyst temperature to increase and fall alternately and repeatedly, to thereby adsorb $NO_X$ in the inflowing exhaust gas in the exhaust gas purifying catalyst when the catalyst temperature falls, and to desorb $NO_X$ adsorbed in the exhaust gas purifying catalyst and reduce the $NO_X$ when the catalyst temperature increases, wherein the catalyst temperature is controlled to increase to a first upper threshold temperature, at which the $NO_X$ adsorbing capacity of the exhaust gas purifying catalyst is substantially zero, and is controlled to fall to a first lower threshold temperature, at which the $NO_X$ adsorbing capacity of the exhaust gas purifying catalyst is substantially a maximum.

According to still another aspect of the present invention, there is provided an exhaust gas purifying device for an engine having an exhaust passage comprising: an exhaust gas purifying catalyst arranged in the exhaust passage capable of temporarily adsorbing $NO_X$ in the inflowing exhaust gas therein, a $NO_X$ adsorbing capacity thereof becoming larger when a temperature of the exhaust gas purifying catalyst becomes higher; and catalyst temperature control means for controlling the temperature of the exhaust gas purifying catalyst, the catalyst temperature control means controlling the catalyst temperature to increase and fall alternately and repeatedly, to thereby adsorb $NO_X$ in the inflowing exhaust gas in the exhaust gas purifying catalyst when the catalyst temperature falls, and to desorb $NO_X$ adsorbed in the exhaust gas purifying catalyst and reduce the $NO_X$ when the catalyst temperature rises, wherein the catalyst temperature is controlled to rise to a first upper threshold temperature, at which the $NO_X$ adsorbing capacity of the exhaust gas purifying catalyst is substantially zero, and is controlled to fall to a first lower threshold temperature, at which the $NO_X$ adsorbing capacity of the exhaust gas purifying catalyst is substantially maximum.

The present invention may be more fully understood from the description of the preferred embodiments of the invention as set forth below, together with the accompanying drawings.

DESCRIPTION OF THE PREFERRED EMBODIMENTS

Figure 1:
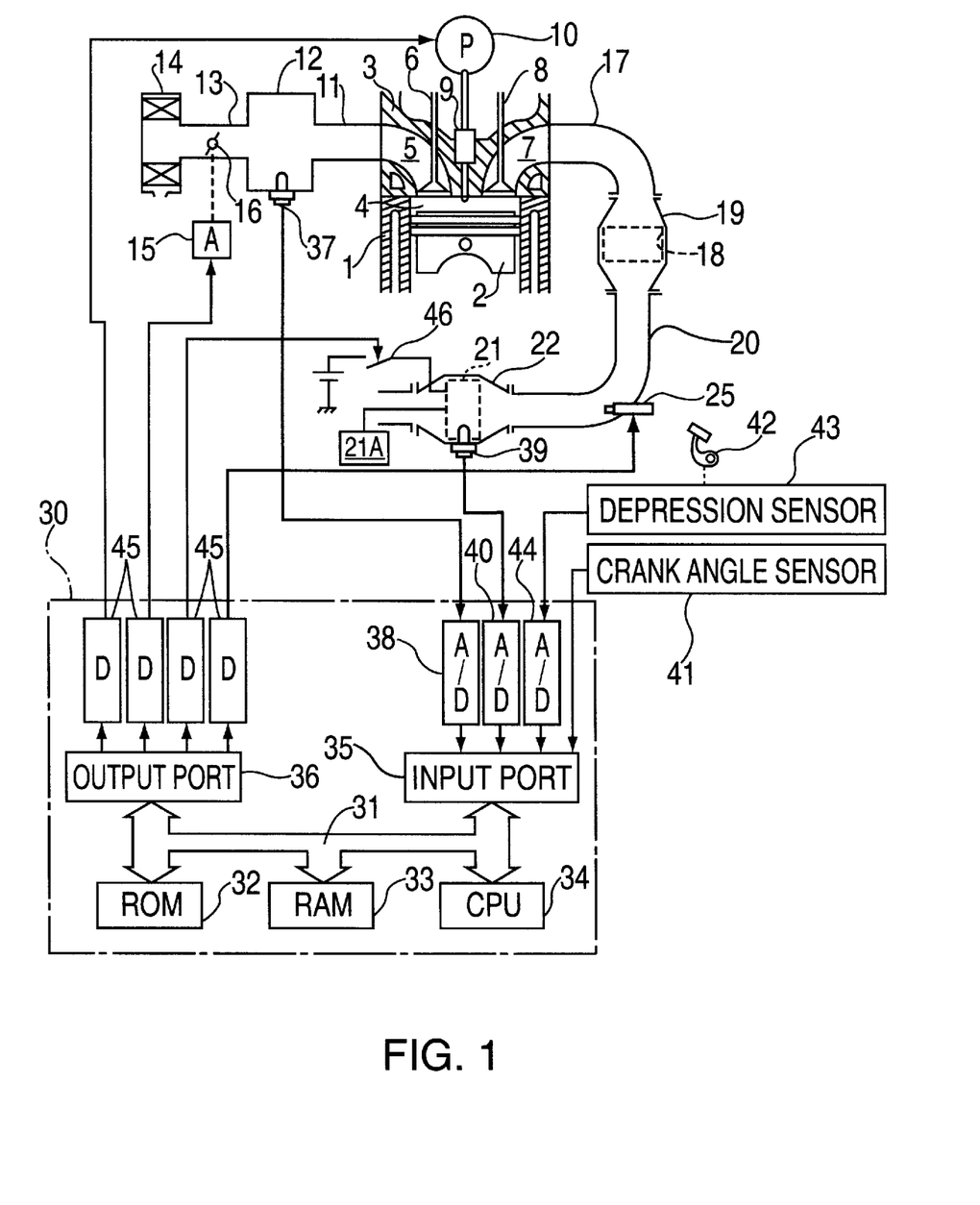
FIG. 1 is a general view of an engine.

FIG. 1 illustrates a case where the present invention is applied to a diesel engine. Alternatively, the present invention may be applied to a spark-ignition engine.

Referring to FIG. 1, a reference numeral 1 designates a cylinder block, 2 designates a piston, 3 designates a cylinder head, 4 designates a combustion chamber, 5 designates an intake port, 6 designates an intake valve, 7 designates an exhaust port, 8 designates an exhaust valve, 9 designates a fuel injector for injecting fuel directly into the combustion chamber 4, and 10 designates a fuel pump for feeding fuel to the fuel injector 9 under pressure, driven by the engine. The intake ports 5 of each cylinder are connected to a common surge tank 12 via corresponding branches 11, and the surge tank 12 is connected to an air cleaner 14 via an intake duct 13. An intake control valve 16 is arranged in the intake duct 13, and is driven by an actuator 15 of a negative pressure or an electromagnetic type. The intake control valve 16 is usually kept fully open, and is slightly closed when the engine load is very low. On the other hand, the exhaust ports 7 of each cylinder are connected to a common exhaust manifold 17, and the exhaust manifold 17 is connected to a catalytic converter 19 housing a $NO_2$ synthesizing catalyst 18 therein. The converter 19 is connected, via an exhaust pipe 20, to a catalytic converter 22 housing an exhaust gas purifying catalyst 21 therein. As mentioned below, the temperature of the exhaust gas flowing to the catalyst 21 is preferably as low as possible, and thus the catalyst 21 shown in FIG. 1 is arranged in the exhaust passage as far downstream as possible. For example, the catalyst 21 may be arranged in a muffler (not shown). Note that the fuel pump 10, and the actuator 15 are controlled by output signals from an electronic control unit 30.

Figure 2:
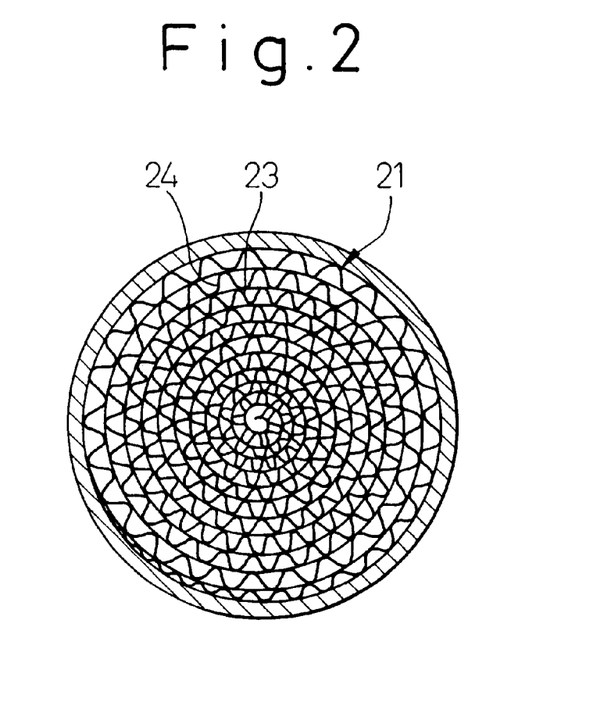
FIG. 2 is a cross-sectional view of an exhaust gas purifying catalyst.

The catalyst 21 shown in FIG. 1 is formed of a electrically heated catalyst or a catalyst with an electric heater 21A. Namely, as shown in FIG. 2, the catalyst 21 is in a form of a flat metal sheet 23 and a corrugated metal sheet 24 wound concentrically and alternately. The catalytic particles are carried on the metal sheets 23 and 24. When the electric current flows through the metal sheets 23 and 24, the metal sheets 23 and 24 generate heat, to thereby heat the catalytic particles. Thus, the metal sheets 23 and 24 constitute the catalytic carrier, while acting as the electric heater. The heater is controlled by output signals from an electronic control unit 30.

Referring to FIG. 1 again, a reducing agent injector 25 is arranged in the exhaust pipe 20 for secondarily supplying a reducing agent. A hydrocarbon such as gasoline, isooctane, hexane, heptane, gas oil, and kerosine or a hydrocarbon which can be stored in a liquid form, such as butane or propane, can be used as the reducing agent. However, the diesel engine shown in FIG. 1 uses fuel of the engine, to be injected from the fuel injection nozzle 9, as the reducing agent. Thus, there is no need to provide an additional tank for the reducing agent. Note that the reducing agent injector 25 is controlled by output signals from the electronic control unit 30.

The electronic control unit (ECU) 30 is constructed as a digital computer and comprises a read-only memory (ROM) 32, a random-access memory (RAM) 33, a CPU (micro processor) 34, an input port 35, and an output port 36, which are interconnected with each other via a bidirectional bus 31. A negative pressure sensor 37 is arranged in the surge tank 11, and generates an output voltage in proportion to the pressure in the surge tank 11. The output voltage of the sensor 37 is input to the input port 35 via an AD converter 38. A temperature sensor 39 is arranged in the catalyst 21, and generates an output voltage in proportion to the temperature TC of the catalyst 21. The output voltage of the sensor 39 is input to the input port 35 via an AD converter 40. The input port 35 is also connected to a crank angle sensor 41, which generates a pulse whenever a crankshaft is turned by, for example, 30 degrees. According to these pulses, the CPU 34 calculates the engine speed N. A depression sensor 43 is connected to an acceleration pedal 42, and generates an output voltage in proportion to an depression DEP of the acceleration pedal 42. The output voltage of the sensor 43 is input to the input port 35 via an AD converter 44. The output port 36 is connected to the fuel pump 10, the actuator 15, the reducing agent injector 25 and a relay 46 for controlling electric power supply to the catalyst 21, via corresponding drive circuits 45.

The exhaust gas purifying catalyst 21 comprises a precious metal, such as platinum Pt and palladium Pd, or a transition metal, such as copper Cu and iron Fe, carried, by an ion changing process, on a porous carrier, such as zeolite and alumina, which is carried on the metal sheets 23 and 24. In the oxidizing atmosphere including the reducing agent, such as hydrocarbon (HC) and carbon monoxide (CO), the catalyst 21 can selectively react $NO_X$ in the inflowing exhaust gas with the HC and CO, to thereby reduce the $NO_X$ to nitrogen $N_2$. Namely, the catalyst 21 can reduce $NO_X$ in the inflowing exhaust gas, even in the oxidizing atmosphere, if the inflowing exhaust gas includes the reducing agent. Note that the following explanation is made for a case where the catalyst 21 is comprised of Pt-zeolite catalyst in which platinum Pt is carried on zeolite. However, the following explanation may be referred to for the other types of catalysts.

Figure 3:
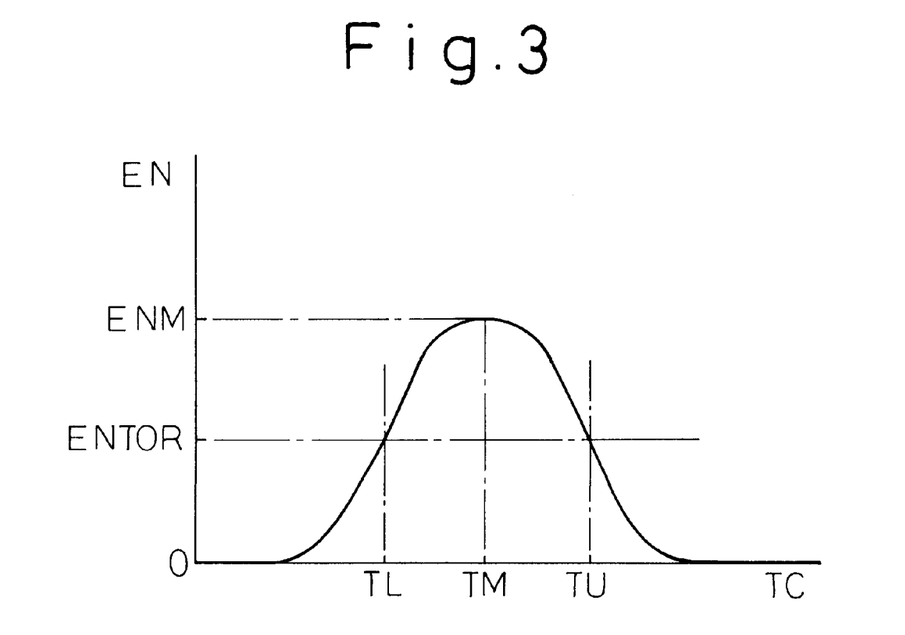
FIG. 3 is a diagram illustrating relationships between a $NO_X$ purification efficiency of the exhaust gas purifying catalyst and the catalyst temperature in a steady state.

FIG. 3 illustrates relationships between a $NO_X$ purification efficiency EN of the exhaust gas purifying catalyst 21 and the catalyst temperature TC. As can be seen from FIG. 3, the $NO_X$ purification efficiency EN becomes the maximum efficiency ENM when the catalyst temperature TC is equal to TM, and becomes lower as the catalyst temperature TC becomes lower than TM, or as TC becomes higher than TM. Further, the $NO_X$ purification efficiency EN is kept higher than an allowable minimum purification efficiency ENTOR when the catalyst temperature is in a range from the lower threshold temperature TL to the upper threshold temperature TU, i.e., when the catalyst temperature is within a window. Note that, for the Pt-zeolite catalyst, the maximum efficiency ENM is in a range from 30% to 50%, and the allowable minimum purification efficiency ENTOR is in a range from 15% to 25%. In this case, the lower threshold temperature TL is approximately 200° C., and the upper threshold temperature TU is approximately 300° C.

Figure 4:
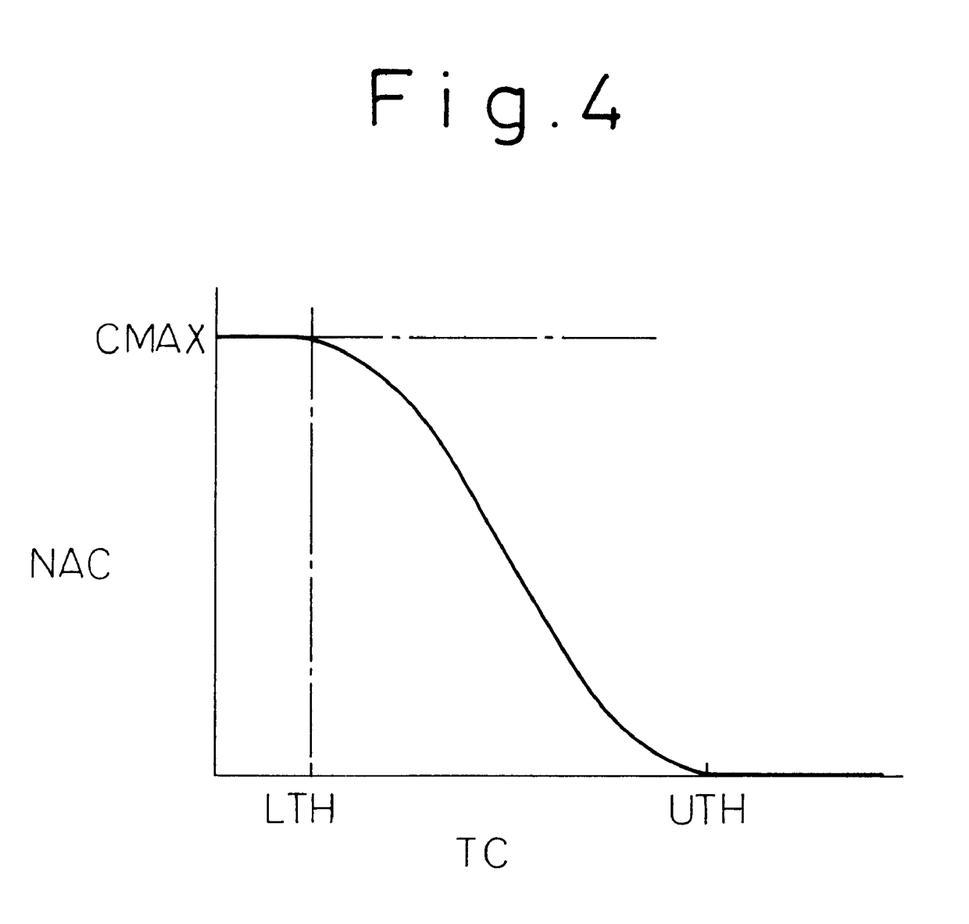
FIG. 4 is a diagram illustrating the $NO_X$ adsorbing capacity of the exhaust gas purifying catalyst.

As described at the beginning, it has been found that the Pt-zeolite catalyst 21 has a $NO_X$ adsorbing function of temporarily adsorbing $NO_X$ in the inflowing exhaust gas. In this case, while the $NO_X$ adsorption mechanism is not completely clear, it is thought that $NO_X$ in the inflowing exhaust gas is adsorbed on the surfaces of platinum Pt particles in the form of $NO_2$, by chemical adsorption. Also, it has been found that the $NO_X$ adsorbing capacity NAC of the Pt-zeolite catalyst 21 becomes larger when the catalyst temperature TC becomes lower, as shown in FIG. 4. Thus, when the catalyst temperature TC drops, the $NO_X$ adsorbing capacity NAC increases, and therefore, $NO_X$ in the inflowing exhaust gas is further adsorbed in the Pt-zeolite catalyst 21 in accordance with the increase in the $NO_X$ adsorbing capacity NAC. On the other hand, when the catalyst temperature TC rises, the $NO_X$ adsorbing capacity NAC decreases, and therefore, $NO_X$ adsorbed in the Pt-zeolite catalyst 21 is desorbed in accordance with the decrease in the $NO_X$ adsorbing capacity NAC.

Almost all of $NO_X$ desorbed from the Pt-zeolite catalyst 21 is reduced and purified in the oxidizing atmosphere including the reducing agent. Accordingly, controlling the catalyst temperature TC to rise and fall alternately and repeatedly to thereby cause the Pt-zeolite catalyst 21 to perform the $NO_X$ adsorption and the $NO_X$ desorption and reduction alternately and repeatedly, provides sufficient $NO_X$ purification. This is the basic exhaust gas purifying method of the present invention.

It is required for increasing the amount of $NO_X$ to be purified to increase the amount of $NO_X$ adsorbed in the Pt-zeolite catalyst 21 when the catalyst temperature drops. Also, it is required for increasing the amount of $NO_X$ to he adsorbed in the Pt-zeolite catalyst 21 when the catalyst temperature drops, to increase the amount of $NO_X$ desorbed from the Pt-zeolite catalyst 21 when the catalyst temperature rises, to thereby ensure the $NO_X$ adsorbing capacity of the Pt-zeolite catalyst 21.

On the other hand, as described before, the $NO_X$ adsorbing capacity of the Pt-zeolite catalyst 21 becomes larger when the catalyst temperature TC becomes lower. Thus, in the present embodiment, the catalyst temperature TC is controlled to drop to a lower threshold temperature LTH at which the $NO_X$ adsorbing capacity NAC becomes substantially the maximum capacity CMAX (shown in FIG. 4), when the catalyst temperature is controlled to drop. Note that the maximum capacity CMAX is determined depending on the volume of the Pt-zeolite catalyst 21, the surface area of the catalyst particles, or the catalyst particles. Thus, controlling the catalyst temperature TC to fall to the lower threshold temperature LTH makes the adsorbed $NO_X$ amount QAN maximum. Also, when the catalyst temperature is controlled to rise, the catalyst temperature is controlled to rise to a upper threshold temperature UTH at which the $NO_X$ adsorbing capacity NAC becomes substantially zero (shown in FIG. 4), in the present embodiment. This makes the adsorbed $NO_X$ amount QAN substantially zero, and thus, allows the Pt-zeolite catalyst 21 to adsorb a large amount of $NO_X$ in the successive $NO_X$ adsorption process. In summary, in the diesel engine shown in FIG. 1, the catalyst temperature is controlled to increase and fall alternately and repeatedly, and is controlled to rise to the upper threshold temperature UTH when the catalyst temperature rises, and is controlled to drop to the lower threshold temperature LTH when the catalyst temperature drops.

Note that it has been found that the lower and the upper threshold temperatures LTH and UTH of the Pt-zeolite catalyst 21 are approximately 150° C., and approximately 350° C., respectively. Thus, the lower threshold temperature LTH is lower than the lower threshold temperature TL defining the window of the Pt-zeolite catalyst 21 (shown in FIG. 3), and the upper threshold temperature UTH is higher than the upper threshold temperature TU defining the window. Therefore, when the catalyst temperature is controlled to rise and fall between the upper threshold temperature UTH and the lower threshold temperature LTH, the catalyst temperature exceeds the window of the Pt-zeolite catalyst 21. In other words, the catalyst temperature is controlled to rise above and fall below the window in the present embodiment.

Figure 5:
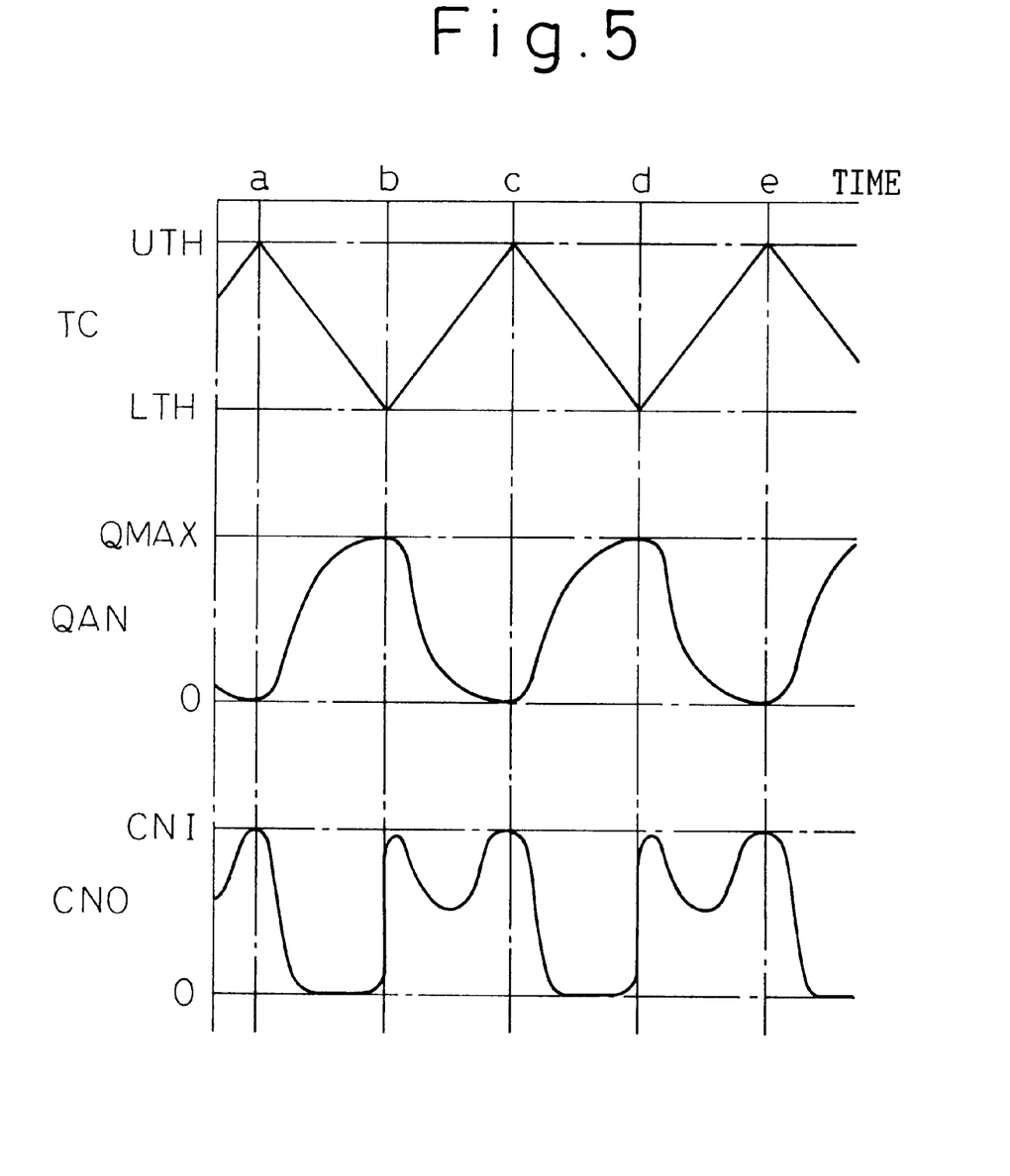
FIG. 5 is a time chart for explaining the exhaust gas purifying method according to the present invention.

Next, the exhaust gas purifying method of the present invention will be further explained, referring to the time chart shown in FIG. 5.

Referring to FIG. 5, the period from time "a" to "be" shows a case where the catalyst temperature drops. As the catalyst temperature TC becomes lower, the adsorbed $NO_X$ amount QAN of the Pt-zeolite catalyst 21 becomes larger, and a concentration CNO of $NO_X$ in the exhaust gas at the outlet of the Pt-zeolite catalyst 21 becomes lower and then substantially becomes zero. Note that CNI shown in FIG. 5 represents a concentration of $NO_X$ in the exhaust gas at the inlet of the Pt-zeolite catalyst 21. Therefore, it can be understood that almost all of $NO_X$ in the inflowing exhaust gas is adsorbed in the Pt-zeolite catalyst 21 when the catalyst temperature drops. Next, when the catalyst temperature TC becomes the lower threshold temperature LTH, the adsorbed $NO_X$ amount QAN becomes the maximum amount QMAX corresponding to the maximum capacity CMAX of the Pt-zeolite catalyst 21.

The successive period from time "b" to "c" shows a case where the catalyst temperature rises. As the catalyst temperature TC becomes higher, the adsorbed $NO_X$ amount QAN becomes smaller. Namely, $NO_X$ is desorbed from the Pt-zeolite catalyst 21. Almost all of the desorbed $NO_X$ is reduced and purified. On the other hand, $NO_X$ in the inflowing exhaust gas when the catalyst temperature rises is purified, substantially with the $NO_X$ purification efficiency EN (see FIG. 3) depending on the catalyst temperature TC at this time. Next, when the catalyst temperature TC reaches the upper threshold temperature UTH, the adsorbed $NO_X$ amount QAN becomes substantially zero.

The temperature reducing process is performed in the successive period from time "c" to "d", and the temperature increasing process is performed in the successive period from time "d" to "e". In this way, the temperature increasing process and the temperature reducing process are performed alternately and repeatedly.

Considering the purification of $NO_X$ flowing into the Pt-zeolite catalyst 21, the $NO_X$ purification efficiency ((CNO−CNI)/CNI) in the temperature rising process is lower than that in the temperature dropping process. Thus, it is preferable that the catalyst temperature TC is controlled to rise to the upper threshold temperature UTH quickly, to thereby shorten the period required for the temperature rising process, as much as possible. Further, when the catalyst temperature TC is controlled to fall to the lower threshold temperature LTH quickly, the $NO_X$ adsorbing capacity of the Pt-zeolite catalyst 21 becomes equal to the maximum capacity thereof quickly. In this case, the catalyst temperature TC may be kept at the lower threshold temperature LTH until the adsorbed NOX amount QAN reaches the maximum amount QMAX.

However, if the catalyst temperature TC is controlled to fall quickly in the temperature reducing process, NO in the inflowing exhaust gas is not oxidized to $NO_2$ in the Pt-zeolite catalyst 21. As a result, NO may be exhausted from the Pt-zeolite catalyst 21 without being adsorbed therein. Thus, in the diesel engine shown in FIG. 1, the $NO_2$ synthesizing catalyst 18 is arranged in the exhaust passage upstream of the Pt-zeolite catalyst 21 and the reducing agent injector 25, for oxidizing NO in the inflowing exhaust gas to $NO_2$. Accordingly, almost all of $NO_X$ flowing into the Pt-zeolite 21 is in the form of $NO_2$, and thus, $NO_X$ can be effectively adsorbed in the Pt-zeolite catalyst 21. Note that the $NO_2$ synthesizing catalyst 18 may be a so-called oxidizing catalyst.

To control the catalyst temperature TC of the Pt-zeolite catalyst 21, that is, to increase or reduce the catalyst temperature TC, any method may be adopted. In the diesel engine shown in FIG. 1, the Pt-zeolite catalyst 21 consists of a catalyst with the heater as described above, and the heater is turned on when the catalyst temperature TC is to be increased, and is turned off when the catalyst temperature is to be reduced. When the heater is turned off, the catalyst temperature falls toward tile temperature of the exhaust gas flowing into the Pt-zeolite catalyst 21. In this case, the Pt-zeolite catalyst 21 is arranged in the downstream section of the exhaust passage as described before, and thus, the temperature of the exhaust gas flowing into the Pt-zeolite catalyst 21 is kept low. Note that a secondary air supply device may be provided for supplying secondary air to the Pt-zeolite catalyst 21 when the catalyst temperature is to be reduced. Alternatively, a coolant passage may be formed in the Pt-zeolite catalyst 21, and the coolant may be supplied through the coolant passage when the catalyst temperature is to be reduced.

If the diesel engine performs a rich operation in which the air-fuel ratio is rich with respect to the stoichiometric air-fuel ratio, undesirable smoke and particulate may be discharged from the cylinder. Thus, the diesel engine shown in FIG. 1 always performs a lean operation, in each cylinder, in which the air-fuel ratio is lean with respect to the stoichiometric air-fuel ratio. Therefore, the exhaust gas flowing into the Pt-zeolite catalyst 21 is always an oxidizing atmosphere. As a result, $NO_X$ desorbed from the Pt-zeolite catalyst 21 is effectively reduced by the reducing agent in inflowing the exhaust gas. In this case, unburned HC and CO discharged from the engine can act as a reducing agent. However, the amount of $NO_X$ to be purified is much larger than that of the unburned HC and CO discharged from the engine, and the reducing agent will be too little to purify $NO_X$ sufficiently. Thus, the reducing agent is secondarily supplied by the reducing agent injector 25 into the exhaust pipe 20, to thereby avoid a shortage of the reducing agent with respect to $NO_X$.

When the catalyst temperature TC drops, almost all of the $NO_X$ flowing into the Pt-zeolite catalyst 21 is adsorbed in the Pt-zeolite catalyst 21, and the reduction of $NO_X$ is hardly conducted. Thus, if the reducing agent is supplied when the catalyst temperature drops, the reducing agent may be discharged from the Pt-zeolite catalyst 21 without purifying $NO_X$. Therefore, in the diesel engine shown in FIG. 1, the supply of the reducing agent by the reducing agent injector 25 is performed only when the catalyst temperature rises, and is stopped when the catalyst temperature drops.

Figure 6:
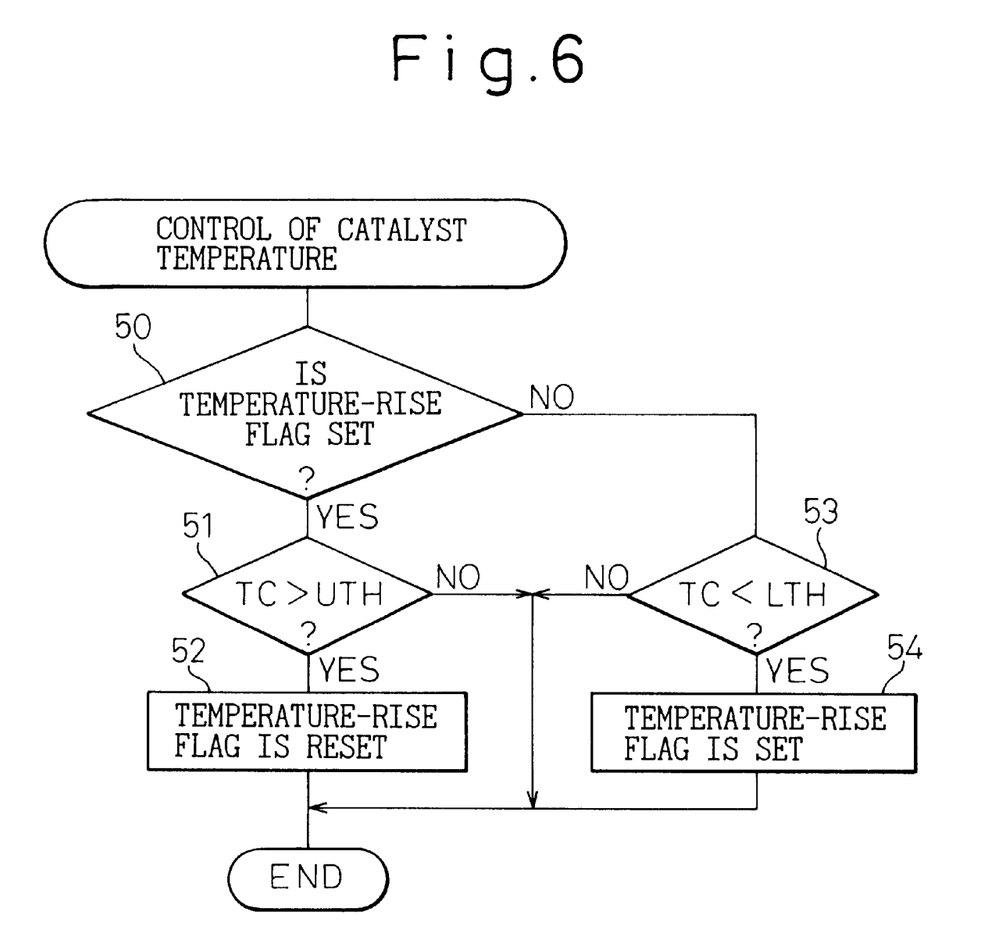
FIG. 6 is a flowchart for controlling the catalyst temperature.
Figure 7:
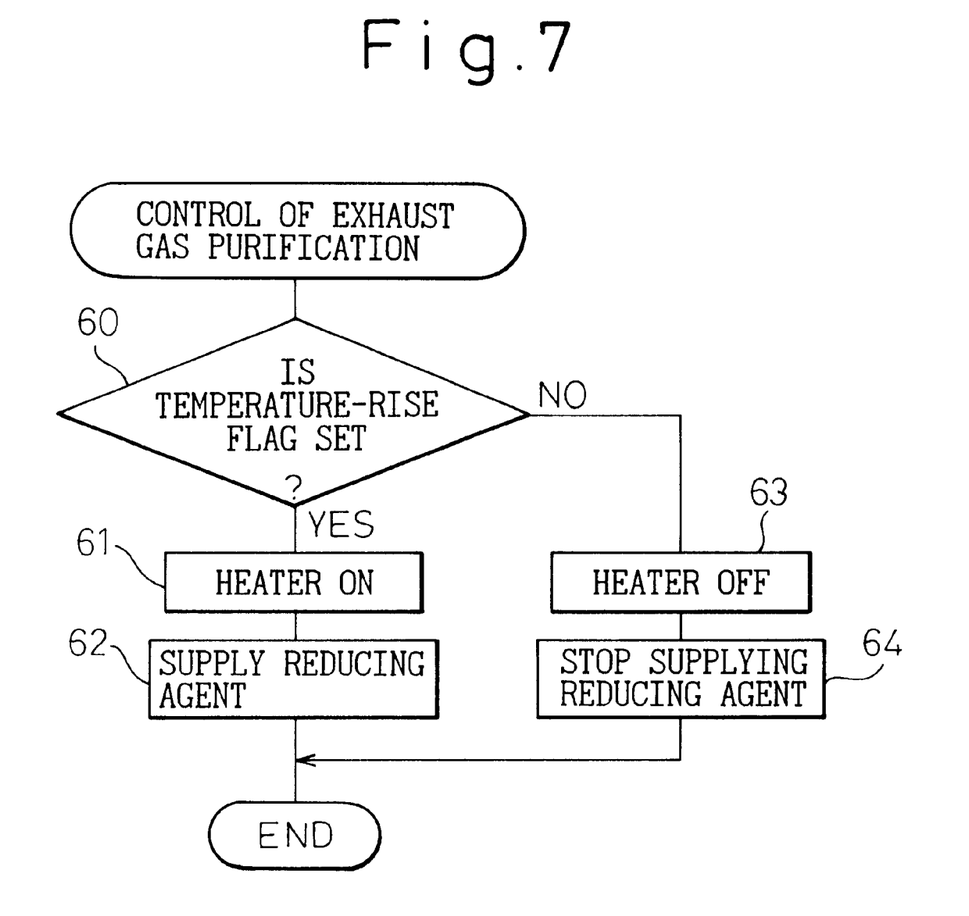
FIG. 7 is a flowchart for controlling the exhaust gas purification.

FIGS. 6 and 7 are routines for executing the embodiment mentioned above. These routines are executing by interruption every predetermined time.

FIG. 6 shows a routine for controlling the catalyst temperature.

Referring to FIG. 6, first, in step 50, it is judged whether a temperature-rise flag is set. The temperature-rise flag is set when the catalyst temperature is to be increased, and is reset when the catalyst temperature is to be reduced. When the temperature-rise flag is set, i.e., when the catalyst temperature is to be increased, the routine goes to step 51, where it is judged whether the catalyst temperature TC is higher than the upper threshold temperature UTH. When TC>UTH, the routine goes to step 52, where it is nudged that the catalyst temperature is to be reduced and the temperature-rise flag is reset. Then, the processing cycle is completed. Contrarily, when TC<UTH, the processing cycle is completed, while the temperature-rise flag is kept set.

However, when the temperature-rise flag is reset in step 50, i.e., when the catalyst temperature is to be reduced, the routine goes to step 53, where it is judged whether the catalyst temperature TC is lower than the lower threshold temperature LTH. When TC<LTH, the routine goes to step 54, where it is judged that the catalyst temperature is to be increased and the temperature-rise flag is set. Then, the processing cycle is completed. Contrarily, when TC>UTH, the processing cycle is completed, while the temperature-rise flag is kept reset.

FIG. 7 shows a routine for controlling the exhaust gas purification.

Referring to FIG. 7, first, in step 60, it is judged whether the temperature-rise flag, which is set or reset in the routine shown in FIG. 6, is set. When the temperature-rise flag is set, i.e., when the catalyst temperature is to be increased, the routine goes to step 61, where the heater of the Pt-zeolite catalyst 21 is turned on. In the following step 62, the supply of the reducing agent by the reducing agent injector 25 is performed. Then, the processing cycle is completed. Contrarily, when the temperature-rise flag is reset in step 60, i.e., when the catalyst temperature is to be reduced, the routine goes to step 63, where the heater is turned off. In the following step 64, the supply of the reducing agent by the reducing agent injector 25 is stopped. Then, the processing cycle is completed.

Figure 8:
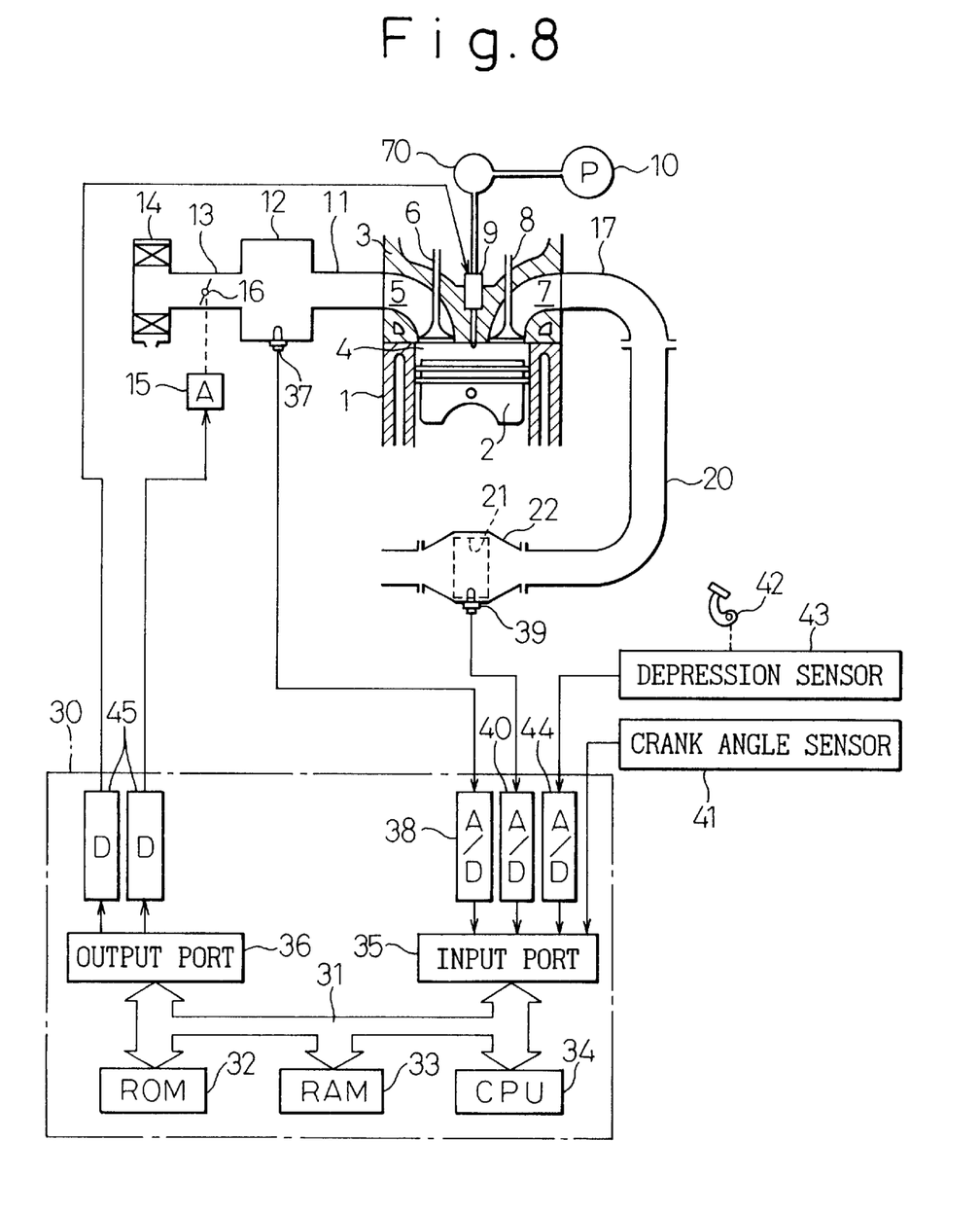
FIG. 8 is a general view of an engine according to another embodiment of the present invention.

FIG. 8 illustrates another embodiment. In FIG. 8, the same reference numerals are used to indicate similar components as in FIG. 1.

Referring to FIG. 8, a fuel injector 9a is arranged in the combustion chamber 4 for injecting fuel directly into the combustion chamber 4, and is of an electromagnetic type. The fuel injector 9a is connected to the fuel pump 10 via the fuel accumulating chamber 70 which is common to the fuel injectors of all cylinders. This allows a plurality of fuel injections in a combustion cycle of each cylinder. No heater is provided in the Pt-zeolite catalyst 21 shown in FIG. 8. Further, the reducing agent injector and the $NO_2$ synthesizing catalyst shown in FIG. 1 are omitted.

In the diesel engine shown in FIG. 8, as in the diesel engine shown in FIG. 1, the catalyst temperature is controlled to increase and fall alternately and repeatedly. Further, the catalyst temperature TC is controlled to the upper threshold temperature UTH when the catalyst temperature increases, and is controlled to the lower threshold temperature LTH when the catalyst temperature falls.

Furthermore, the reducing agent is supplied to the Pt-zeolite catalyst 21 to reduce $NO_X$ effectively. However, in the diesel engine shown in FIG. 8, the reducing agent is supplied by the fuel injector 9a. Namely, the fuel injection is made twice in one cycle, the first is the normal fuel injection conducted around, for example, the top dead center of the compression stroke, the second is a secondary fuel injection conducted at the expansion or exhaust stroke of the engine, to thereby supply the reducing agent to the exhaust gas. Note that fuel injected by the secondary fuel injection seldom contributes to the engine output.

It has been found that the zeolite catalyst such as the Pt-zeolite catalyst 21 performs a HC adsorption and desorption in which the catalyst adsorbs HC in the inflowing exhaust gas in its micro-pores when the catalyst temperature is low, by physical adsorption, and desorbs the adsorbed HC when the catalyst temperature becomes higher. Further, it is thought that HC is desorbed from the Pt-zeolite catalyst 21 and $NO_X$ is desorted from the Pt-zeolite catalyst 21 very close to each other, and thus the $NO_X$ desorbed from the Pt-zeolite catalyst 21 can be effectively purified. Therefore, in the diesel engine shown in FIG. 8, the secondary fuel injection is conducted even when the catalyst temperature falls, to supply the reducing agent to the Pt-zeolite catalyst 21. However, the HC adsorbing capacity of the Pt-zeolite catalyst 21 is relatively small. Thus, the amount of fuel injected by the secondary fuel injection when the catalyst temperature TC falls is smaller than that when the catalyst temperature increases.

Further, in the diesel engine shown in FIG. 8, the secondary fuel injection timing is controlled to control the catalyst temperature TC. Namely, when the secondary fuel injection timing is advanced, the amount of secondary fuel burned in the combustion chamber 4 increases, and thus, the temperature of exhaust gas flowing into the Pt-zeolite catalyst 21 increases. As a result, the catalyst temperature increases. Contrarily, when the secondary fuel injection timing is retarded, the amount of secondary fuel burned in the combustion chamber 4 decreases, and thus, the temperature of exhaust gas flowing into the Pt-zeolite catalyst 21 falls. As a result, the catalyst temperature falls. For example, the secondary fuel injection timing may be set at 90° CA after the top dead center of compression when the catalyst temperature is to be increased, and may be set at 150° CA after the top dead center of compression when the catalyst temperature is to be reduced.

Figure 9:
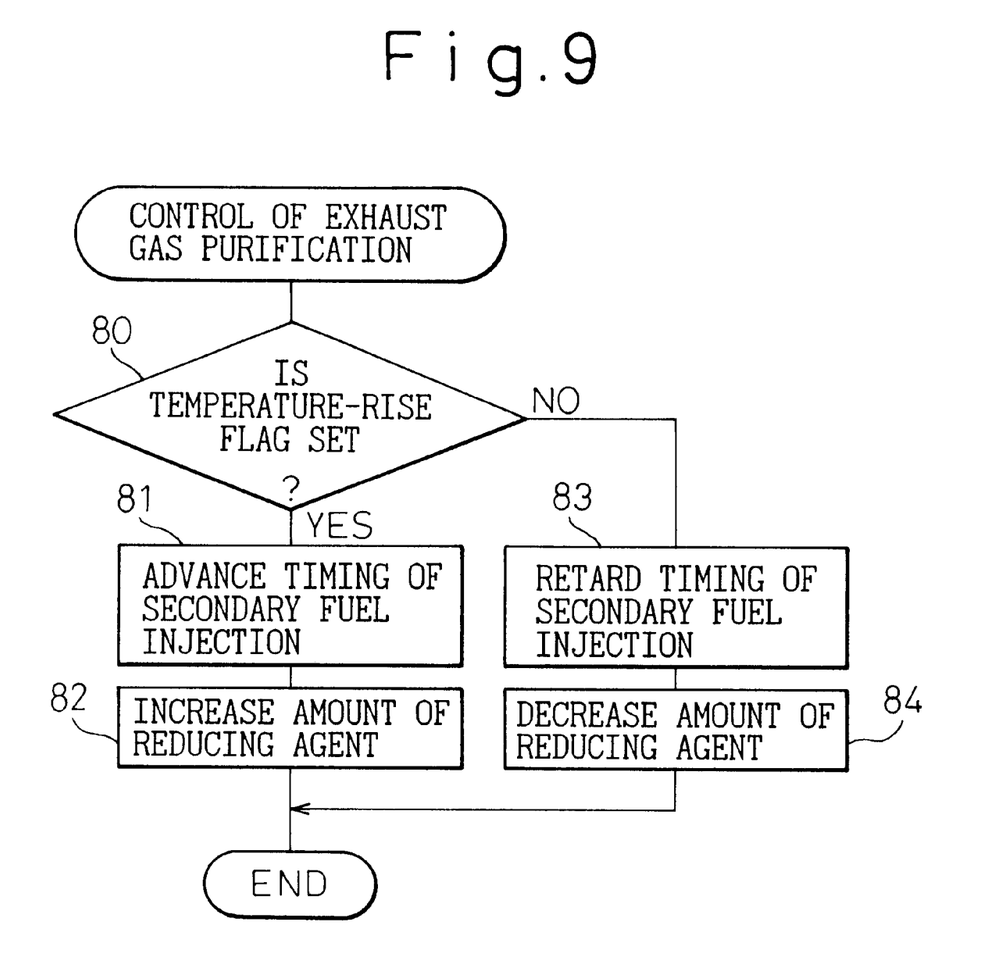
FIG. 9 is a flowchart for controlling the exhaust gas purification in the embodiment shown in FIG. 8.

FIG. 9 shows a routine for controlling the exhaust gas purification mentioned above. This routine is executed by interruption every predetermined time.

Referring to FIG. 9, first, in step 80, it is judged whether the temperature-rise flag is set, which is set or reset in the routine shown in FIG. 6. When the temperature-rise flag, i.e., when the catalyst temperature is to be increased, the routine goes to step 81, where the secondary fuel injection timing is advanced. In the following step 82, the amount of the reducing agent is increased. Then, the processing cycle is completed. Contrarily, when the temperature-rise flag is reset in step 80, i.e., when the catalyst temperature is to be reduced, the routine goes to step 83, where the secondary fuel injection timing is retarded. In the following step 84, the amount of the reducing agent is decreased. Then, the processing cycle is completed.

In the embodiments described above, the temperature sensor 39 is provided for detecting the catalyst temperature TC. However, the catalyst temperature TC can be estimated on the basis of the temperature of the exhaust gas flowing into the Pt-zeolite catalyst 21, and the exhaust gas temperature can also be estimated on the basis of the engine operating condition, such as the depression DEP of the accelerator pedal 40 and the engine speed N. Consequently, the catalyst temperature TC may be estimated on the basis of the engine operating condition.

According to the present invention, it is possible to provide an exhaust gas purifying device for an engine capable of making an amount of $NO_X$ adsorbed in the exhaust gas purifying catalyst larger, to thereby purifying $NO_X$ sufficiently.

While the invention has been described by reference to specific embodiments chosen for purposes of illustration, it should be apparent that numerous modifications could be made thereto by those skilled in the art without departing from the basic concept and scope of the invention.

I claim:

1. An exhaust gas purifying device for an engine having an exhaust passage comprising:

an exhaust gas purifying catalyst arranged in the exhaust passage wherein a $NO_X$ adsorbing capacity of the exhaust gas purifying catalyst increases as a temperature of the exhaust gas purifying catalyst decreases, and wherein when the catalyst temperature increases toward a first threshold temperature, the $NO_X$ previously adsorbed therein is desorbed therefrom, wherein, at the first threshold temperature, the $NO_X$ adsorbing capacity of the exhaust gas purifying catalyst is substantially zero; and catalyst temperature control means for controlling the catalyst temperature, the catalyst temperature control means alternately and repeatedly decreasing the catalyst temperature below and increasing the catalyst temperature above the first threshold temperature to adsorb $NO_X$ therein when the catalyst temperature falls below the first threshold temperature, and to desorb therefrom $NO_X$ previously adsorbed therein when the catalyst temperature increases above the first threshold temperature, wherein the desorbed $NO_X$ is reduced.

2. An exhaust gas purifying device according to claim 1, further comprising reducing agent supplying means for supplying a reducing agent to the exhaust gas flowing to the exhaust gas purifying catalyst, wherein an amount of reducing agent supplied when the catalyst temperature increases is larger than that when the catalyst temperature falls.

3. An exhaust gas purifying device according to claim 2, wherein the reducing agent supplying means stops the supply of reducing agent when the catalyst temperature falls.

4. An exhaust gas purifying device according to claim 2, wherein the engine includes a combustion chamber and a fuel injector arranged to inject fuel directly into the combustion chamber, wherein the reducing agent supplying means controls the fuel injector to inject fuel secondarily at one of an expansion and exhaust stroke of the engine, and wherein the secondary fuel injection is performed when reducing agent is to be supplied.

5. An exhaust gas purifying device according to claim 4, wherein the catalyst temperature control means controls a timing of the secondary fuel injection, and wherein the timing of the secondary fuel injection is advanced when the catalyst temperature is to be increased, and the timing of the secondary fuel injection is retarded when the catalyst temperature is to be reduced.

6. An exhaust gas purifying device according to claim 1, further comprising an electric heater coupled to the exhaust gas purifying catalyst wherein the catalyst temperature control means turns on the electric heater when the catalyst temperature is to be increased, and turns off the electric heater when the catalyst temperature is to be reduced.

7. An exhaust gas purifying device according to claim 1, wherein, when the catalyst temperature is higher than a second predetermined threshold temperature, a $NO_X$ purification efficiency in a steady state of the exhaust gas purifying catalyst is lower than an allowable minimum $NO_X$ purification efficiency, and wherein the first threshold temperature is higher than the second threshold temperature.

8. An exhaust gas purifying device according to claim 1, further comprising a $NO_2$ synthesizing catalyst arranged in the exhaust passage upstream of the exhaust gas purifying catalyst, the $NO_2$ synthesizing catalyst synthesizing $NO_2$ from NO in the exhaust gas flowing into the exhaust gas purifying catalyst.

9. An exhaust gas purifying device according to claim 1, wherein the exhaust gas purifying catalyst comprises one of a precious metal and a transition metal carried on porous carrier.

10. An exhaust gas purifying device for an engine having an exhaust passage comprising:
   an exhaust gas purifying catalyst arranged in the exhaust passage wherein a $NO_X$ adsorbing capacity of the exhaust gas purifying catalyst increases as a temperature of the exhaust gas purifying catalyst becomes lower, wherein when the catalyst temperature decreases toward a first threshold temperature, $NO_X$ previously adsorbed therein is desorbed therefrom, and wherein, at the first threshold temperature, the $NO_X$ adsorbing capacity of the exhaust gas purifying catalyst is a maximum amount; and
   catalyst temperature control means for controlling the catalyst temperature, the catalyst temperature control means alternately and repeatedly decreasing the catalyst temperature to and increasing the catalyst temperature above the first threshold temperature to adsorb $NO_X$ therein when the catalyst temperature falls to the first threshold temperature, and to desorb therefrom $NO_X$ previously adsorbed therein when the catalyst temperature increases above the first threshold temperature, wherein the desorbed $NO_X$ is reduced.

11. An exhaust gas purifying device according to claim 10, further comprising reducing agent supplying means for supplying a reducing agent to the exhaust gas flowing to the exhaust gas purifying catalyst, wherein an amount of reducing agent supplied when the catalyst temperature increases is larger than that when the catalyst temperature falls.

12. An exhaust gas purifying device according to claim 11, wherein the reducing agent supplying means stops the supply of reducing agent when the catalyst temperature falls.

13. An exhaust gas purifying device according to claim 11, wherein the engine includes a combustion chamber and a fuel injector arranged to inject fuel directly into the combustion chamber, wherein the reducing agent supplying means controls the fuel injector to inject fuel secondarily at one of an expansion and exhaust stroke of the engine, and wherein the secondary fuel injection is performed when reducing agent is to be supplied.

14. An exhaust gas purifying device according to claim 13, wherein the catalyst temperature control means controls a timing of the secondary fuel injection, and wherein the timing of the secondary fuel injection is advanced when the catalyst temperature is to be increased, and the timing of the secondary fuel injection is retarded when the catalyst temperature is to be reduced.

15. An exhaust gas purifying device according to claim 10, further comprising an electric heater coupled to the exhaust gas purifying catalyst wherein the catalyst temperature control means turns on the electric heater when the catalyst temperature is to be increased, and turns off the electric heater when the catalyst temperature is to be reduced.

16. An exhaust gas purifying device according to claim 10, wherein, when the catalyst temperature is lower than a second predetermined threshold temperature, a $NO_X$ purification efficiency in a steady state of the exhaust gas purifying catalyst is lower than an allowable minimum $NO_X$ purification efficiency, and wherein the first threshold temperature is lower than the second threshold temperature.

17. An exhaust gas purifying device according to claim 10, further comprising a $NO_2$ synthesizing catalyst arranged in the exhaust passage upstream of the exhaust gas purifying catalyst, the $NO_2$ synthesizing catalyst synthesizing $NO_2$ from NO in the exhaust gas flowing into the exhaust gas purifying catalyst.

18. An exhaust gas purifying device according to claim 10, wherein the exhaust gas purifying catalyst comprises one of a precious metal and a transition metal carried on porous carrier.

19. An exhaust gas purifying device for an engine having an exhaust passage comprising:
   an exhaust gas purifying catalyst arranged in the exhaust passage wherein a $NO_X$ adsorbing capacity of the exhaust gas purifying catalyst decreases as a temperature of the exhaust gas purifying catalyst becomes higher and wherein the $NO_X$ absorbing capacity of the exhaust gas purifying catalyst decreases as the catalyst temperature rises above a first lower threshold temperature to a substantially zero level of $NO_X$ absorbing capacity at a first upper threshold temperature, wherein the first upper threshold temperature is higher than the first lower threshold temperature so that, as the catalyst temperature increases above the first lower threshold temperature toward the first upper threshold temperature, $NO_X$ previously adsorbed therein is desorbed therefrom, wherein, at the first lower threshold temperature, the $NO_X$ adsorbing capacity of the exhaust gas purifying catalyst is a maximum amount; and
   catalyst temperature control means for controlling the catalyst temperature, the catalyst temperature control means alternately and repeatedly decreasing the catalyst temperature to the first lower threshold temperature and increasing the catalyst temperature to the first upper threshold temperature to adsorb $NO_X$ therein when the catalyst temperature falls toward the first lower threshold temperature, and to desorb therefrom $NO_X$ previously adsorbed therein when the catalyst temperature increases toward the first upper threshold temperature, wherein the desorbed $NO_X$ is reduced.

20. An exhaust gas purifying device according to claim 19, further comprising reducing agent supplying means for supplying a reducing agent to the exhaust gas flowing to the exhaust gas purifying catalyst, wherein an amount of reducing agent supplied when the catalyst temperature increases is larger than that when the catalyst temperature falls.

21. An exhaust gas purifying device according to claim 20, wherein the reducing agent supplying means stops the supply of reducing agent when the catalyst temperature falls.

22. An exhaust gas purifying device according to claim 20, wherein the engine includes a combustion chamber and a fuel injector arranged to inject fuel directly into the combustion chamber, wherein the reducing agent supplying means controls the fuel injector to inject fuel secondarily at one of an expansion and exhaust stroke of the engine, and wherein the secondary fuel injection is performed when reducing agent is to be supplied.

23. An exhaust gas purifying device according to claim 22, wherein the catalyst temperature control means controls a timing of the secondary fuel injection, and wherein the timing of the secondary fuel injection is advanced when the catalyst temperature is to be increased, and the timing of the secondary fuel injection is retarded when the catalyst temperature is to be reduced.

24. An exhaust gas purifying device according to claim 19, further comprising an electric heater coupled to the exhaust gas purifying catalyst wherein the catalyst temperature control means turns on the electric heater when the catalyst temperature is to be increased, and turns off the electric heater when the catalyst temperature is to be reduced.

25. An exhaust gas purifying device according to claim 19, wherein, when the catalyst temperature is one of lower than a second upper threshold temperature and higher than a second upper threshold temperature, a $NO_X$ purification efficiency in a steady state of the exhaust gas purifying catalyst is lower than an allowable minimum $NO_X$ purification efficiency, and wherein the first upper threshold temperature is higher than the second upper threshold temperature, and wherein the first lower threshold temperature is lower than the second lower threshold temperature.

26. An exhaust gas purifying device according to claim 19, further comprising a $NO_2$ synthesizing catalyst arranged in the exhaust passage upstream of the exhaust gas purifying catalyst, the $NO_2$ synthesizing catalyst synthesizing $NO_2$ from NO in the exhaust gas flowing into the exhaust gas purifying catalyst.

27. An exhaust gas purifying device according to claim 19, wherein the exhaust gas purifying catalyst comprises one of a precious metal and a transition metal carried on porous carrier.

* * * * *

UNITED STATES PATENT AND TRADEMARK OFFICE
CERTIFICATE OF CORRECTION

PATENT NO.   : 5,996,338
DATED        : December 7, 1999
INVENTOR(S)  : Shinya Hirota It is certified that error appears in the above-identified patent and that said Letters Patent is hereby corrected as shown below:

Column 6,
Line 24, change "be" to -- b --.

Column 7,
Line 29, change "tile" to -- the --.

Column 8,
Line 19, change "TC<UTH" to -- TC$\leq$UTH --.

Column 9,
Line 19, change "desorted" to -- desorbed --.

Signed and Sealed this

Sixth Day of November, 2001

*Attest:*

NICHOLAS P. GODICI
*Attesting Officer*     *Acting Director of the United States Patent and Trademark Office*